United States Patent [19]

Watchorn

[11] 4,453,488
[45] Jun. 12, 1984

[54] CONNECTOR FOR JOINING STRUCTURAL COMPONENTS

[75] Inventor: Ernest W. Watchorn, Vancouver, Canada

[73] Assignee: E. W. Watchorn & Associates, Inc., Vancouver, Canada

[21] Appl. No.: 346,505

[22] Filed: Feb. 8, 1982

[51] Int. Cl.³ .............................................. B63B 35/38
[52] U.S. Cl. ..................... 114/266; 114/263; 403/221; 403/224; 403/227; 403/337; 405/219
[58] Field of Search ...................... 114/77 R, 264, 266, 114/267, 263; 405/218, 219, 220, 221; 403/221, 224, 227, 335, 337; 14/27

[56] References Cited

U.S. PATENT DOCUMENTS

| 3,091,203 | 5/1963 | Usab | 405/219 |
| 3,306,053 | 2/1967 | Fulton | 114/266 |
| 3,967,569 | 7/1976 | Shorter, Jr. | 114/266 |

Primary Examiner—Trygve M. Blix
Assistant Examiner—Rodney Corl
Attorney, Agent, or Firm—Hughes, Barnard & Cassidy

[57] ABSTRACT

A connector for joining structural components which may be subjected to bending, shear, tensional and/or torsional forces at the joint is comprised of a fixture member spanning the joint between the structural components for coupling the same along a longitudinal connector axis generally normal to the joint, socket members disposed within each of the components to be joined and through which the fixture member passes, the sockets defining a shear pocket configured to receive a resilient shear cushion. The fixture member is preferably a compressive fixture member and includes resilient compression cushion members disposed intermediate the length thereof outwardly proximate the shear pocket and inwardly proximate adjustable compression members for establishing a compressive force across the joint. A bending cushion may be disposed at the joint between the structural components.

30 Claims, 9 Drawing Figures

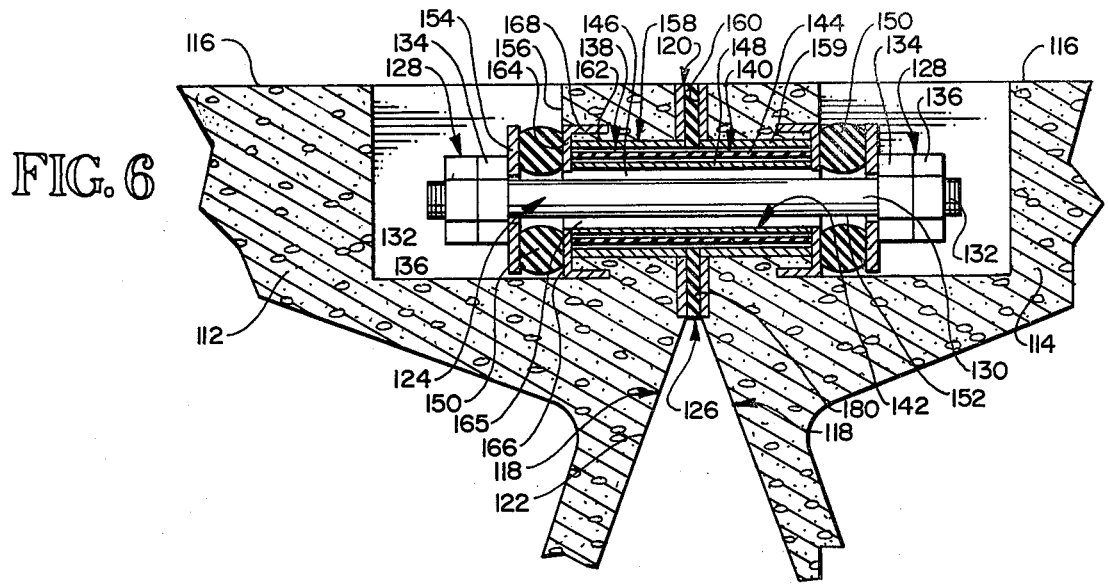
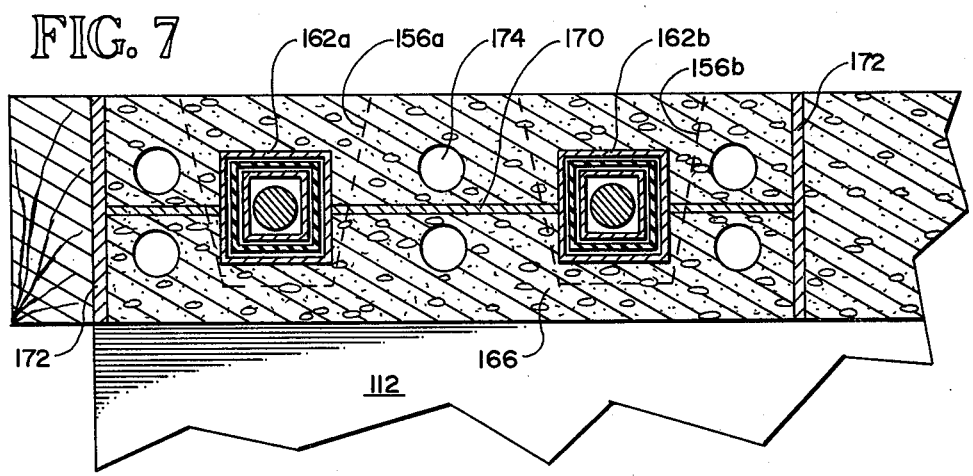
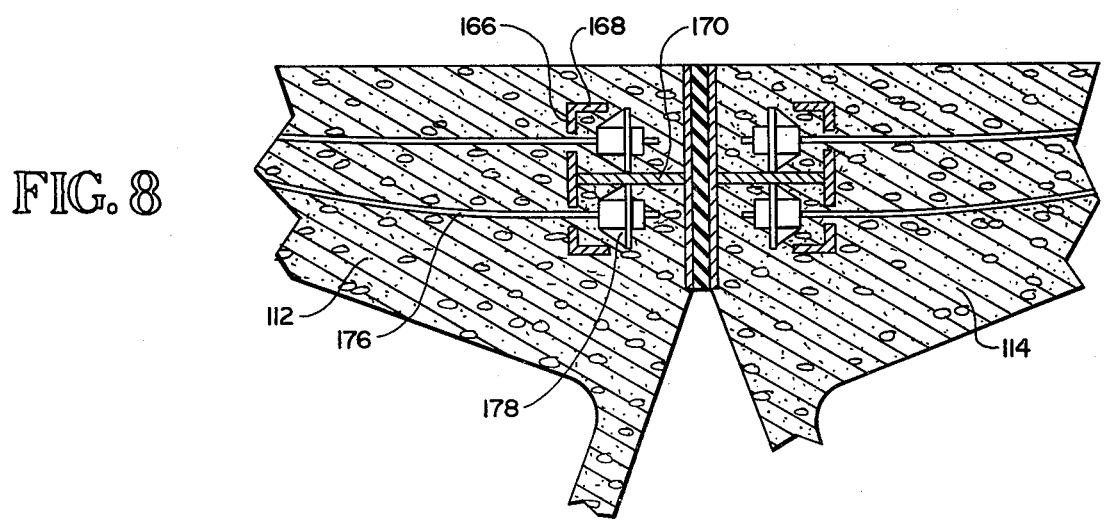

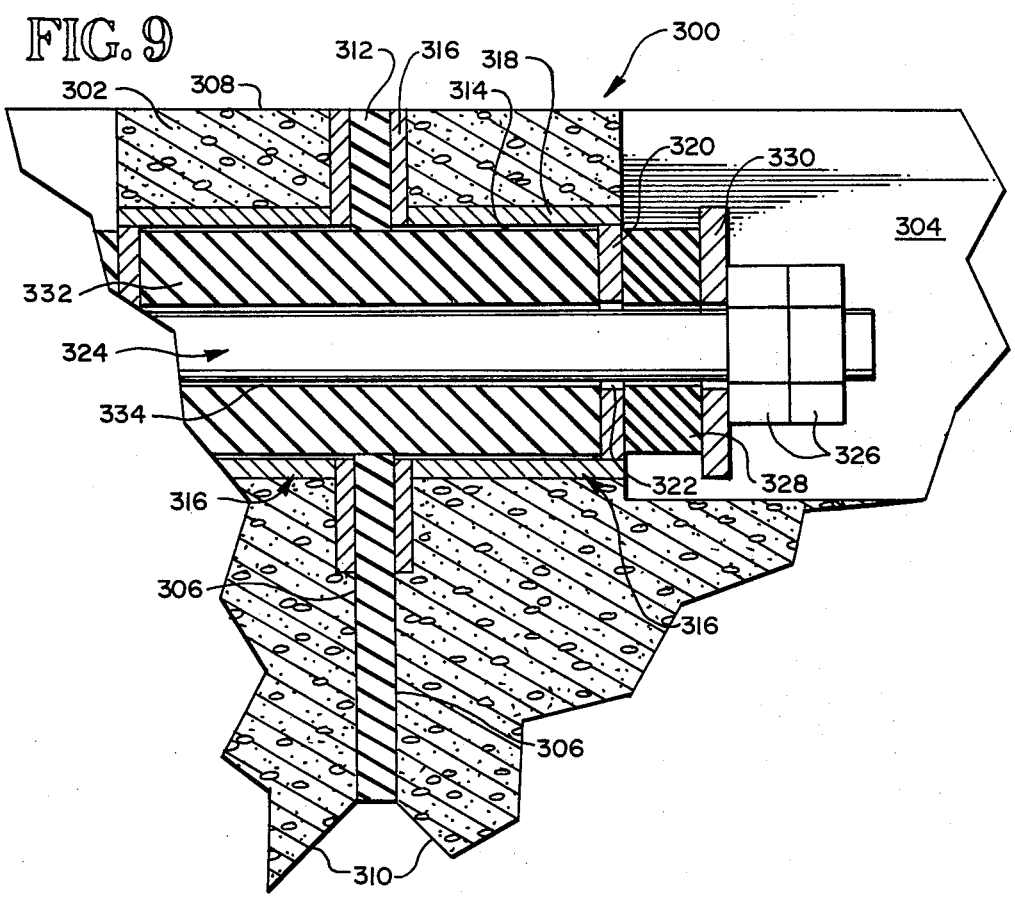

CONNECTOR FOR JOINING STRUCTURAL COMPONENTS

BACKGROUND OF THE INVENTION

1. Field of the Invention

The present invention relates, generally, to connectors for joining two structural components together and, more especially, to such a connector for joining water-borne components which may be subjected to bending, shear, tensional and/or torsional forces at the joint.

2. Description of the Background Art

Myriad devices have been proposed for joining structural components together. Where the structural components are buoyant and designed to be water-borne, many restrictions are imposed upon the design of a simple yet highly efficient connector device. As opposed to connections for components bottomed on a solid foundation, the fluid underpinning for a buoyant structure coupled with climatic variations complicates considerably the design of an effective connector while the environment demands high reliability in use.

U.S. Pat. No. 2,565,369 discloses a form of articulated floating platform where the components are joined by a type of hinge. The connector includes a shock absorbing member which, in combination with the hinge, is disclosed to permit twisting of one platform vis-a-vis its neighbor. Thus, the connector structure disclosed in this patent allows for some relative freedom of movement between adjacent platforms.

U.S. Pat. No. 2,798,448 discloses a coupler for use in joining barges together in a semi-rigid manner. The coupling includes a pair of base assemblies mounted for rotation on vertical axes on either of the barge members to be joined, a connecting block pivotally mounted on a horizontal axis, and a connecting bar extending between the assemblies. The coupling permits some vertical movement of the barges with respect to each other due to the pivotal mounting of the block with respect to the base. This is augmented somewhat by a spring which further serves as a type of shock absorber. Hence, some relative movement of the connected barges is permitted while coupling is maintained.

U.S. Pat. No. 3,091,203 discloses yet another approach for connecting buoyant members together to form a wharf. In general, the sections of the wharf are separated by a resilient pad through which passes a fastener such as a flexible metal cable designed to maintain a compressive force across the juncture. A metal rod may be used in lieu of the cable in this connector structure. This approach, when a metal rod is employed, will minimize the ability of one component to shift vis-a-vis another. Where a cable is used as a connector element between or array a number of units, it is expected that over there will be lateral separation at the joint between adjacent components over a period of time.

Another floating structure including a connector joint is disclosed in U.S. Pat. No. 3,276,209. This approach secures a pair of floating members by an "H"-shaped connector formed by joining two "T"-shaped metal elements along the single axis by a resilient polymeric pad. The arms of the overall "H" connector are secured to adjacent structural components by means of fixture bolts or the like. It is expected that the resiliency of the intermediate polymeric pad in this connector will permit some limited movement between the members. An alternate approach is also disclosed in this patent, that being a type of hinge including a shock absorber, the overall approach being fairly similar in conceptual terms to that disclosed in the aforementioned '369 patent.

U.S. Pat. No. 3,306,053 discloses a connector for use in joining concrete piers or pontoons to form a dock. In general, a heavy rubber pad is interposed between adjacent dock sections within opposing recesses formed therein. The rubber block is maintained in position by means of a stainless cable extending across the juncture. The cable is stressed to hold the adjacent dock sections together and maintain the positioning of the intermediate pad. This arrangement is disclosed to restrict motion between adjacent structures except in a buckling mode.

U.S. Pat. Nos. 3,645,225 and 3,799,100 disclose a flexible connector for, e.g., joining a tug and barge together. The connector is comprised of a number of resilient posts which fit within opposing bores or channels in the tug and barge to be joined. The post is specially configured to be received in locking engagement achieved through a circumferentially restricted intermediate portion near either end of the post and cooperating engagement bars associated with the tug/barge members which fit within the restriction and prevent the post from being withdrawn.

Certain of the foregoing connector designs permit or accommodate relative motion between the structures joined by the connector, whereas some seek to minimize this type of relative motion. In some instances, the connectors permit wide-ranging motion between adjacent components and do not appropriately restrict excessive or gross movement between the structures. Where one is concerned with the connection between water-borne structural components, it is necessary to accommodate a tendency for relative motion in quite a number of different directions while restricting gross motion between the components. Thus, for reliable and efficient connection, the connector itself should be able to tolerate bending, shear, tensional and/or torsional forces at the joint without failure while maintaining a positive interlock between adjacent structures. These forces, which have components in three independent directions (i.e., along mutually orthogonal xyz axes) result from wind and wave action as well as loading on the components themselves where the same are, e.g., pontoon members joined together to form a dock, wharf, breakwall or the like.

Thus, the need exists to provide an efficient connector for structural components, especially water-borne components such as pontoons or the like, which will restrain gross motion between adjacent components as the result of bending, shear, tensional and/or torsional forces existing or applied near or at the juncture.

SUMMARY OF THE INVENTION

The present invention advantageously provides a simple yet highly efficient and reliable connector of the character aforesaid which is capable of joining two structural components together and restraining the same against gross movement in response to bending, shear, tensional and/or torsional forces at the joint. Thus, the connector of the present invention may desirably be used to join pontoons or other water-borne structures together in the form of a dock, wharf, breakwall or the like. The connectors of the present invention are likewise adaptable for securing water-borne components together to form larger, load-bearing structures which can receive, for example, vehicles or which can support building structures thereon.

These and other advantages of the present invention are achieved by providing a connector which is comprised of a fixture means spanning the joint between the two structural components along a longitudinal connector axis generally normal to the joint, socket means disposed within the components to be joined and defining a shear pocket surrounding the fixture means and a resilient shear cushion means disposed within the shear pocket. The fixture means provides the coupling force between components and is preferably a compressive fixture means; in which case the connector further comprises resilient compression cushion means disposed intermediate the length of the compression fixture means outwardly proximate the sockets and inwardly proximate adjustable compression members which establish a compressive force across the joint. Preferably, the shear cushion has a longitudinal dimension slightly longer than the combined depths of projection of the socket members so that a joint gap is provided at the juncture; and a bending cushion means is disposed within that joint gap. It is also preferred that a metal shear key be disposed within the socket inwardly proximate the shear cushion and outwardly proximate the fixture means in the transverse direction, with the shear key spanning the joint. When the metal shear key is present, it may be preferable to dimension the length of the shear key/shear cushion vis-a-vis the thickness of the bending cushion so that the shear key/shear cushion has a longitudinal dimension slightly less than that of the shear pocket, so that full compressive forces across the joint are applied across the bending cushion and not resolved or otherwise dissipated within the shear components.

In a preferred form of the present invention, the socket means include couplers restrained within a cavity formed in each of the structural components where the end wall of each coupler includes an inner force-bearing face disposed toward the joint and an outer force-bearing face separating the shear pocket from an access recess formed in the components to be joined. The compressive fixture means in this preferred form is a threaded bolt which extends through the cavities and through an aperture formed in the end wall of the couplers terminating in threaded nuts. The resilient compression cushion members in this form of the invention are disposed intermediate the compression nuts and the outer force-bearing faces of the coupler members.

The connectors of the present invention are well adapted for use in joining concrete pontoons or similar water-borne structural components. When used in this environment, the couplers are cast within the uncured concrete and are restrained in position by means of tendons which pass through anchor apertures in the couplers and terminate in locking means for tensioning the tendons and anchoring the couplers.

The connectors of the present invention may be used in a single or a multiple (i.e., tandem) embodiment spaced appropriately along the length of the joint between the pontoons. Shear forces are absorbed, distributed, and dissipated through the shear cushion and shear key if the latter is present. Tensional forces are resisted, and dissipated by means of the compressive fixture member and compression cushions. Bending forces are absorbed and dissipated throughout the structure through the bending cushion disposed at the joint itself, while shear components of such a bending force are resolved as noted above. Torsional forces are resolved throughout the three independent cushion means. Thus, structural elements joined by the instant connector are reliably secured against forces resulting from wind and wave action as well as those imposed by any loads applied vertically upon the pontoons or barge members even should those loads be imbalanced across the juncture itself; for example, where vehicles pass from one component to another.

Other advantages of the present invention and a fuller understanding of its manner of construction and operation will be gained by an examination of the following detailed description thereof, taken in conjunction with the figures of drawing, wherein:

BRIEF DESCRIPTION OF THE DRAWINGS

FIG. 6 is a sectional view taken substantially along the line 6—6 of FIG. 5;

FIG. 7 is a sectional view taken substantially along the line 7—7 of FIG. 5;

FIG. 8 is a sectional view taken substantially along the line 8—8 of FIG. 5; and, FIG. 9 is a fragmentary side sectional view of an alternate embodiment of a connector in accordance with the present invention.

DETAILED DESCRIPTION OF THE INVENTION

The present invention relates, generally, to connectors for joining structural components together and, more especially, to connectors for joining water-borne structural components which are anticipated to encounter bending, shear, tensional and/or torsional forces at the joint due to, e.g., loading forces on the components and/or wind and wave action. Accordingly, the invention will now be described with reference to certain preferred embodiments within that context. But, those skilled in the art will appreciate that such an exemplary description is made for illustrative purposes only and should not be deemed limitative of the scope of the connectors disclosed and claimed herein.

Figure 1:
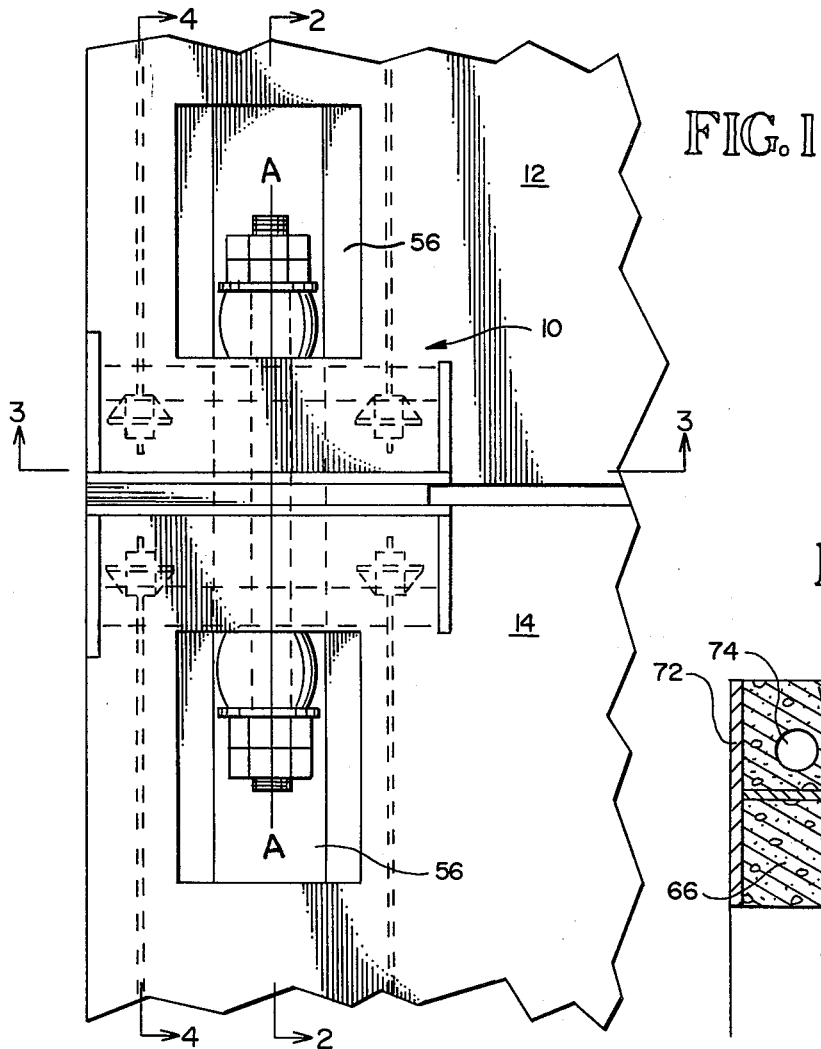
FIG. 1 is a top plan view showing a connector in accordance with the present invention joining two structural elements.

Turning to the figures of drawing, in all of which like parts are identified with like reference numerals, FIG. 1 illustrates a connector in accordance with the present invention, designated generally as 10, joining a first water-borne pontoon 12 to a second water-borne pontoon 14. In the embodiment shown, each of the structures 12 and 14 is a concrete pontoon of generally conventional design which includes a top face 16 and an end face designated generally as 18 having a joint area identified generally as 20 and inwardly slanted walls 22 progressing from the joint 20 to the lower terminus of the pontoon (not shown). The connector 10 joins the pontoons 12 and 14 along a longitudinal connector axis identified as A—A in FIG. 1 in a manner which permit only slight relative motion between the two pontoons even though the same be subjected to bending, shear, tensional and/or torsional forces at the juncture. Along these lines, those skilled in the art will appreciate that the juncture between pontoons 12 and 14 will normally be achieved by two or more connectors 10 spaced appropriately along the opposing end faces thereof; only one such connection being illustrated herein for the sake of clarity and ease of description.

The pontoons are secured together by a coupling-effective force across the juncture. For this general purpose, the connector 10 is comprised of a fixture means identified generally as 24 scanning the joint identified generally as 26 between the two pontoons 12 and 14. Fixture means 24 is preferably a compressive fixture means which terminates at either end in adjustable compression means for establishing a compressive force across the joint 26. In the preferred embodiment shown, the compressive fixture means 24 is comprised of a bolt 30 terminating at either end in threaded portions 32 which receive inner and outer nuts 34 and 36, respectively. The compressive force established across the joint 26 may be adjusted by tightening or loosening the inner nuts 34 to an appropriate extent, while the outer nuts 36 serve as a locking mechanism as is generally conventional with this type of bolt/nut design.

Shear forces are routinely encountered at the joints between water-borne components such as the pontoons 12 and 14; arising due to wind and wave action or loading on the components. The connector 10 includes shear resisting/dissipating components to accommodate such forces.

Each of the pontoons 12 and 14 is formed with a socket identified generally as 38 and 40, respectively. Each of the sockets is in the general form of a blind hole leading from the joint face 20 intermediate the height thereof inwardly of the pontoon. The internal cavity defined collectively by the two sockets 38 and 40 comprises a shear pocket identified generally as 42 surrounding the compressive fixture means 24 intermediate its central length. A resilient shear cushion means 44 is disposed within the shear pocket 42; the length of the shear cushion being approximately equal to or slightly greater than the combined depths of the socket 38 and 40 as measured from the joint face 20 inwardly. The shear cushion 44 is preferably formed from a synthetic rubber, such as butyl rubber, having an overall outer geometry complementary to that of the inner geometry of sockets 38 and 40 and a central longitudinal channel 46 through which the fixture means 24 may pass internally thereof. In the preferred embodiment shown in FIGS. 1–4, a metallic shear key 48 is included as a component of the shear cushion means 44. In this preferred embodiment, the shear cushion 44 and metal shear key 48 are formed as an integral component, with the outer rubber cushion being bonded to the outer face of the shear key. Alternately, the two shear members could be formed as separate components with the metal shear key 48 nested internally of the rubber shear cushion externally adjacent the central portion of the compressive fixture means 24.

In the preferred embodiment illustrated in FIGS. 1–4, the internal cross-sectional geometry of the sockets 38 and 40 is rectilinear. Thus, in this preferred form, the shear cushion has an overall rectilinear exterior, most preferably square. Likewise, the shear key has this same preferred rectilinear, most preferably square, cross section. In the most preferred embodiments of the invention, the shear key is ideally made from a section of square tube stock or from welded channel stock, for ease of manufacture, yielding a generally square internal channel for passage of the bolt or fixture means 24. In some embodiments the shear key may be omitted, in which case it is preferred that the resilient shear cushion have a considerably thicker side wall so that its central channel lies fairly close to the outer surface of the bolt 24. In such embodiments, the internal configuration of the channel might be square, rectangular or circular to accommodate the bolt 24.

Tensional and/or torsional forces at the joint will act along or be resolved about the connector axis A—A. This, in turn, will have an effect on the coupling force provided by fixture means 24. Accordingly, connector 10 is designed to insure secure coupling is not diminished due to such forces.

Tensional and/or torsional forces at the joint are transmitted to and dissipated in part by first and second resilient compression cushion means 50 located outwardly adjacent the end walls of the sockets 38 and 40 and inwardly adjacent the adjustable compression means 28. The compression cushion means 50 are formed from synthetic rubber, such as butyl rubber, having a generally cylindrically tubular configuration including an inner bore or channel 52 through which the compressive fixture means 24 may pass. One end of the cushion means 50 abuts the end wall of the respective socket while the other end abuts a washer-like member 54 interposed between the inner nut 34 and the cushion 50.

Access to the opposing terminal ends of the fixture bolt 24 and associated compression means 28 and compression cushion means 50 is achieved by forming recesses 56 in each of the pontoons 12 and 14 leading from the top faces 16 thereof and projecting to a depth sufficient to allow assembly of the connector and manipulation of the terminal components thereof. Insofar as the inner end face of the recess 56, identified generally as 58, forms an outer force-bearing face for receipt of the compressive cushion member 50 and, in combination with the end wall of the sockets 38 and 40, is necessary to provide integrity for the shear pocket within which the shear cushion/shear key is disposed, it is preferred to include a coupler identified generally as 59 in each of the socket 38 and 40 leading from the joint face 20 to the inner end wall 58 of the pontoon components.

Each coupler 59 is comprised of an end plate 60 somewhat in the form of a flange having a face generally coincident with the joint face 20, and an intermediate socket wall or side wall 62 leading from the end plate 60 to an interior end wall 64 within which an aperture 65 is formed through which fixture means 24 may pass. The overall geometrical configuration of the central portion of the coupler 58 is one mating generally with the geometry of the shear pocket 46; a rectilinear geometry being shown in the figures, as best viewed in FIG. 3. In a preferred mode of construction, the couplers 59 are fabricated from corrosion resistant metallic materials which can be joined by welding individual components into the illustrated structure. Most preferably, the socket wall 62 is formed from a segment of rectangular tube stock to which is attached a centrally pierced rectangular plate as the end wall 60 at the first end and a section of channel stock, also suitably pierced, as the inner end wall 64. Thus, the end wall 64 will include a first plate or wall member 66 having outwardly projecting legs 68 at the upper and lower ends thereof, as best viewed in FIG. 2. The end wall 66 will thereby include an inner force-bearing face against which the shear cushion may engage under static and/or dynamic loading at the joint, and an outer force-bearing face with which the compressive cushion means 50 may engage.

Figure 3:
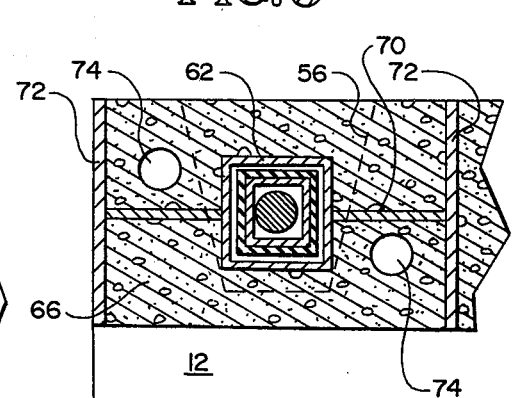
FIG. 3 is a sectional view taken substantially along the line 3—3 of FIG. 1.
Figure 2:
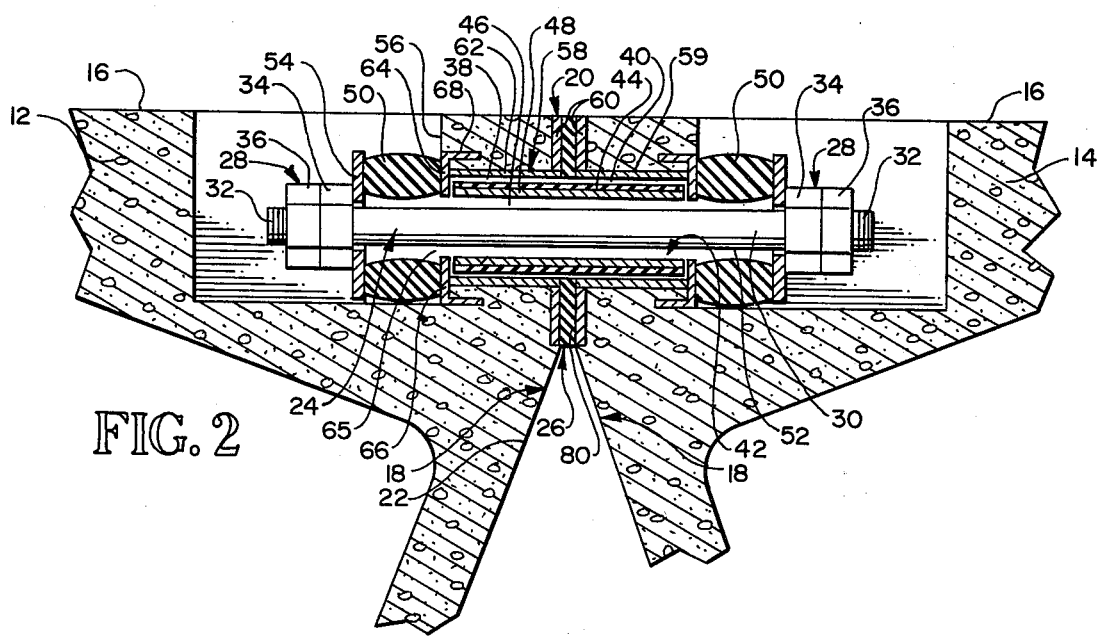
FIG. 2 is a sectional view taken substantially along the line 2—2 of FIG. 1.
Figure 4:
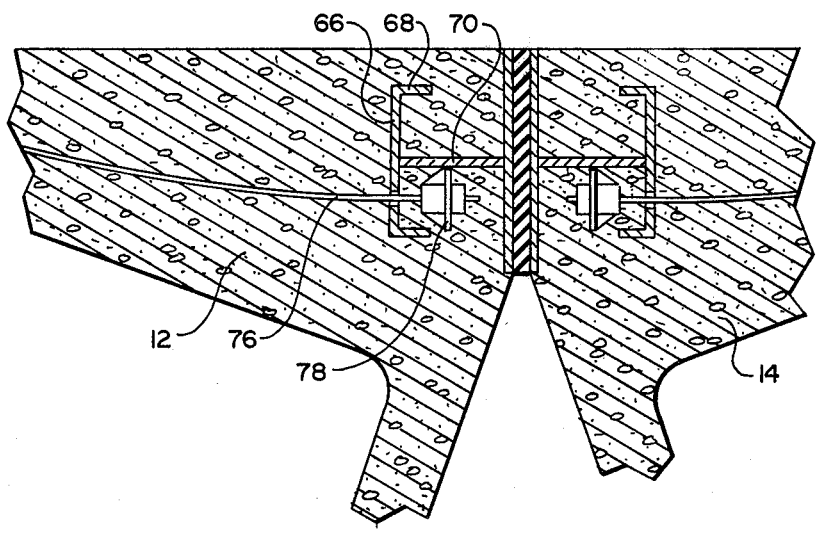
FIG. 4 is a sectional view taken substantially along the line 4—4 of FIG. 1.

The legs 68, being disposed within the cast concrete of the pontoons themselves and assuming a type of re-entrant position (due to the use of channel stock as the most preferred structural element for this component of the coupler), add measurably to the pull-out resistance of the coupler 59. This pull out resistance is further augmented by including anchoring structure on the coupler. With reference to FIG. 3, a pair of transverse walls 70 extend from the sides of the socket wall 62 terminating at inner and outer plates 72 which box the channel of end wall 64. The walls 70 thus provide an added measure of overall rigidity to the coupler 59. The wall 66 is formed with apertures 74 through which may pass anchoring tendons 76 which terminate in locking members 78 in an anchoring assembly generally conventional in cast concrete structures. In the embodiment shown in FIGS. 1-4, the anchoring apertures 74 are located in diametrically opposite quadrants of the end plate 66 to balance the anchoring forces and assist in uniform resolution of external forces applied to the joint. When cast in place, the couplers 59 are firmly anchored within the pontoons and provide good force bearing surfaces to permit the application of suitable compressive forces across the joint.

Bending at joint 26 is to be anticipated. Insofar as bending forces may, in a general conceptual sense be resolved as combined shear and tenional forces, the components of connector 10 designed to accommodate such forces will likewise collectively accommodate bending. Nonetheless, it will oftentimes be advantageous to incorporate additional specific structure to respond directly to bending/buckling at the joint. A bending pad or cushion 80 is preferably included for this purpose. In one preferred embodiment a gap at joint 26 results from a preferred structural orientation between the combined shear cushion/shear key and the relative longitudinal dimension of the shear pocket. As noted above, it is sometimes preferred that the overall length of the shear cushion/shear key be somewhat slightly greater than the combined depths of projection of the sockets 38 and 40 within the two pontoons. Therefore, when the opposing ends of the shear cushion/shear key butt the end walls within the sockets, mating between the joint faces 20 will be precluded and a gap thereby established. In this preferred mode of construction, the resilient bending pad or cushion means 80 is interposed within the gap. The cushion 80 is preferably a pad of synthetic rubber such as butyl rubber having, in the preferred embodiment shown, an overall rectilinear form with a central aperture or hole formed therein so that the pad will fit across the entire joint face while permitting the shear cushion/shear key and fixture bolt to pass across the joint itself. It should also be remarked that sometimes it is preferable that the shear cushion/shear key not butt the opposing end walls of the shear pocket when this bending cushion is included in the overall connector structure; but that the shear cushion/shear key have a slightly loose longitudinal fit within the shear pocket. A reason for this alternative configuration is to insure that the compressive forces across the joint be established across the bending cushion and not be felt in the shear components. Under many circumstances, this is a highly desirable construction. The absolute relative lengths of the shear key/shear cushion versus the shear pocket may vary widely provided the former is long enough to span the joint but short enough that it does not butt both ends of the pocket in the connector. In terms of absolute dimensioning, the length of the shear cushion/shear key need only be about 10% (or less) shorter than the entire longitudinal dimension of the shear pocket, taking into account the added thickness of the bending cushion; provided substantially all of the compressive joint force is felt across the bending cushion. As shown, for example, in FIG. 2, even a few percent difference will provide this function; and that can normally be achieved or accommodated by sizing the thickness of the bending pad or cushion appropriately. If this alternative be adopted, it will be appreciated that the inner end faces of the shear pocket, or at least one of them, will technically not be "force-bearing" at least under static conditions; although under certain dynamic conditions this force-bearing attribute will be presented. Thus, those skilled in the art will appreciate that the term "force-bearing" as applied to the inner end faces of the shear pocket, as used throughout the specification and claims herein, is meant to comprehend this eventuality.

Figure 5:
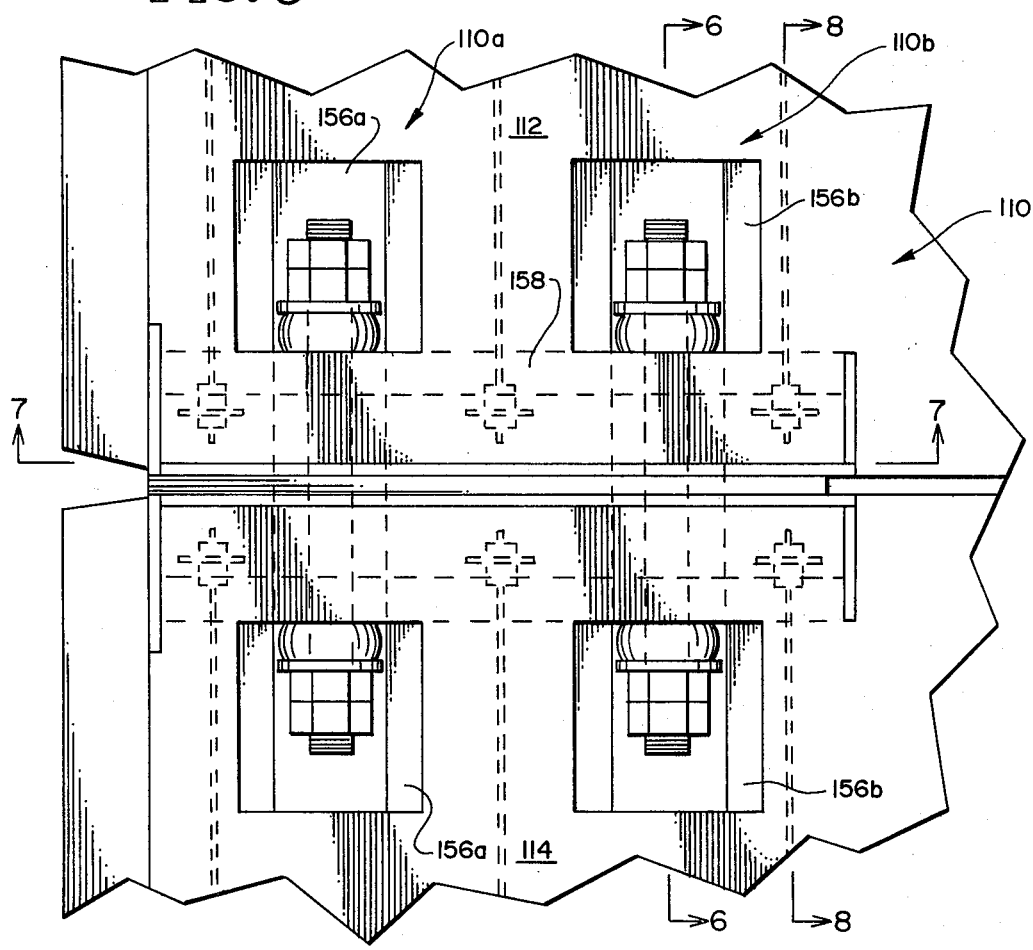
FIG. 5 is a top plan view of a tandem connector in accordance with the present invention.

FIGS. 1-4 show a single connector embodiment. Where this design is elected, pontoons 12 and 14 will be joined periodically along the length of the juncture by the connectors 10, spaced suitably to achieve the desired degree of coupling. FIGS. 5-7 illustrate an alternate embodiment where dual connectors are employed for added rigidity of coupling. Overall, the structure of the tandem connector shown in FIG. 5, designated generally as 100, mirrors the structure of the connector 10 described above. The connector 100 is comprised of two separate but interrelated individual connector members 110(a) and 110(b) shown joining adjacent concrete pontoons 112 and 114. [To the extent possible, structure in the alternate embodiment of FIGS. 5-8 is identified with the same reference numerals as corresponding structure in FIGS. 1-4, using a 100 series; e.g., pontoon 112 corresponds with pontoon 12, compressive fixture means 124(a), 124(b) correspond to compressive fixture means 24, etc.] The principal structural differences between the tandem embodiment and the single embodiment resides in the overall anchoring structure of the couplers 159 which are augmented to include additional internal stiffening walls 170 and additional anchoring apertures 174 in order to accommodate the larger size necessary by virtue of the additional connector 110.

The embodiment of FIGS. 5-8 further differs from that in FIGS. 1-4 insofar as the shear key 148 is separate from the shear cushion 144 as opposed to the bonded composite employed in the embodiment of FIGS. 1-4. Along these lines, either approach (i.e., bonded versus non-bonded) can be employed in either embodiment at the desires of the fabricator. This embodiment also differs from the former in that it illustrates a connector (and for illustrative purposes) where the shear cushion/shear key combination rests against the inner end faces of the shear pocket as opposed to the embodiment shown most clearly in FIG. 2; although either approach could be used at the option of the designer. Furthermore, while the embodiment illustrated in FIGS. 5-8 shows two fixture members 124, this should not be viewed as an indication that the connectors of the present invention consist of only one or two such fixture means—to the extent a fabricator might desire to employ three or more fixture means (e.g., bolts) per connector, that is envisioned within the broad aspects of the present invention.

Yet another embodiment of the present invention is shown in FIG. 9 where a connector designated generally as 300 is shown joining a pair of pontoons designated generally as 302 and 304. Each pontoon includes a generally vertical joint face 306 leading from an upper face 308 to a tapering end wall 310. A joint identified 312 is defined between the opposing end faces 306 of the two pontoons. Each of the pontoons includes a socket designated generally 314 within which is inserted a coupler 316 similar to the couplers described above. Thus, each coupler includes a flange-type end face 316, a socket wall 318, and an end wall 320. The end wall 320 is formed with a central aperture 322 through which compressive fixture means 324 may pass. As was the case in respect of the embodiments described above, compressive fixture means 324 is preferably a threaded bolt which terminates at either end in a pair of adjustable compression fasteners such as nuts 326. Disposed inwardly proximate the nuts 326 and outwardly proximate the end walls 320 are a pair of resilient compression cushion means 328 (only the one associated with pontoon 304 being shown). Preferably, a washer member 330 is interposed between innermost nut 326 and cushion 328 to provide a more uniform application of compressive force across this component of the connector.

A resilient shear cushion 332 is disposed within the sockets 314, spanning the joint 312 and enveloping the central portion of the compressive fixture means 324. The shear cushion means is preferably formed from a resilient synthetic rubber, such as butyl rubber, having a width dimension slightly less than the internal dimension of the sockets 314 and having a cross sectional geometry complementary therewith. The length of the shear cushion 332 is preferably greater than the combined depths of projection of the two sockets 314 in order to establish a gap at the joint 312. The shear cushion 332 is formed with a central channel 334 through which bolt 324 may pass. In this embodiment of the connector, there is no shear key and, accordingly, it is preferred that the channel 334 be circular to accommodate the circular central portion of the bolt 324 and that its inner diameter be only slightly greater than the outer diameter of the bolt. In the embodiment shown in FIG. 9, the gap at joint 312 is not filled with a bending cushion such as was the case in respect of the foregoing embodiments. However, at the options of the fabricator, a similar bending cushion formed from, e.g., butyl rubber may be interposed between the faces 316 of the couplers. Likewise, the connector 300 might be modified to include a tandem fixture means as shown in FIGS. 5-8, should that be necessary or desirable.

In use, the connector of the instant invention in any of its disclosed embodiments efficiently restricts gross movement between adjacent structural members while accommodating forces across the joint in the nature of bending, shear, tension, and/or torsion. The compressive fixture means together with the compressive cushion members securely join the components such as floating or buoyant pontoons and resist motion along the connector axis in either a compressive or tensional mode. Thus, the two pontoons are maintained in secure alignment. Torsional forces across adjacent pontoons are resisted and resolved across the juncture by virtue of the plurality of connectors spaced along and comprising the joint as a whole. Thus, end-to-end coupling provided, e.g., by two connectors disposed intermediate but near the ends of the juncture of a pair of pontoons effectively force-couples the structures together in a manner resisting gross torsional or rotational movement. The individual connectors themselves contribute somewhat further to the overall resolution/resistance of torsional/rotational movement as a consequence of the positive coupling force provided by the fixture bolt(s) of the connector augmented further where the shear cushion is a non-circular one, such as illustrated in the figures herein, and yet further still when the metallic shear key is associated therewith.

The shear cushion/shear key combination efficiently resists gross movement when a shear force is present at the joint due to, e.g., an imbalance in downwardly directed loads on the adjoining pontoons. Wind and wave action, which contribute to a type of buckling mode at the joint, will be resisted by the central components (i.e., compressive fasteners and shear cushion/shear key), while the bending cushion disposed intermediate the two pontoons at the joint area will tend to absorb and dissipate forces resulting from this bending tendency and also maintain good separation between adjacent pontoons.

As can be seen from the foregoing, the instant connector is one which possesses an inherent simplicity of design while nonetheless providing a more efficient and reliable device for joining structural elements, particularly water-borne structural elements such as buoyant pontoons. The connector components are readily fabricated from commonly available materials and may be cast into place where the structural components are made from concrete or the like. The connector is equally well adapted for use in joining structural elements made from other materials and thus is widely adaptable for nearly any application where the joint between structural components will experience bending, shear, tension, and/or torsional forces.

Accordingly, while the invention has now been described with reference to certain preferred embodiments thereof, those skilled in the art will appreciate that various substitutions, modifications, changes and omissions may be made without departing from the spirit thereof. Consequently, it is intended that the scope of the present invention be limited solely by that of the following claims.

What is claimed is:

1. A connector for joining two structural components, which may be subjected to bending, shear, tensional and/or torsional forces at the joint, comprising:
   a. compressive fixture means for spanning the immediate region of a joint between two structural components along a connector axis and terminating on either side of said joint at a location intermediate the length dimension of said structural components measured along said axis, said compressive fixture means having first and second ends disposed outwardly of said joint along said axis each of which includes adjustable compression means associated with a respective one of said structural components for establishing a coupling-effective force across said joint;
   b. first and second socket means, one of each disposed in one of said structural components, having a first open, joint end and a second closed end including an end wall with aperture means through which said compressive fixture means may pass and side walls transversely spaced from said connector axis;

c. a shear pocket defined within said socket means between opposing end walls thereof and said side walls;

d. shear cushion means disposed within said shear pocket spanning said joint, for receiving, distributing and dissipating joint forces, said shear cushion means including central channel means through which said compressive fixture means may pass; and, e. compression cushion means for receiving, distributing and dissipating joint forces, disposed at either end of said compressive fixture means inwardly proximate said adjustable compression means and outwardly proximate said socket end walls.

2. The connector of claim 1, wherein each of said socket means includes a coupler having a joint face including an aperture at the open end of said socket, coupler side walls generally coincident with said socket side walls and a coupler end wall generally coincident with said socket end wall and including an aperture through which said compressive fixture means may pass.

3. The connector of claim 2, wherein said coupler end wall has an inner force-bearing face for engagement with said shear cushion under static and/or dynamic loading at said joint and an outer force-bearing face for proximate engagement with said compression cushion means.

4. The connector of claim 3, wherein said coupler end wall separates said shear pocket from an access recess in said structural component.

5. The connector of claim 2, further comprising bending cushion means disposed at said joint intermediate opposing joint faces of said couplers.

6. The connector of claims 1, 2, 3, 4 or 5, further comprising shear key means disposed within said shear pocket interiorly of said shear cushion channel means and exteriorly of said compressive fixture means.

7. The connector of claim 6, wherein said compressive fixture means is comprised of at least one bolt having threaded ends for receiving cooperating nuts which comprise said adjustable compression means.

8. The connector of claim 7, wherein said compressive fixture means is comprised of a plurality of bolts disposed in spaced, generally parallel relationship along said axis, and further wherein each of said bolts passes interiorly of a respective shear cushion means.

9. The connector of claim 8, wherein each of said shear cushion means is disposed in a shear pocket, said shear pockets being separated by the distance between said bolts.

10. The connector of claim 6, wherein each of said shear, compressive and bending cushion means is a synthetic rubber cushion.

11. The connector of claim 10, wherein said structural components are concrete components and further wherein said couplers are anchored in said concrete prior to curing.

12. A connector for joining two structural components, which may be subjected to bending, shear, tensional and/or torsional forces at the joint, comprising:

a. a fixture bolt spanning the joint between two structural components along a connector axis, having threaded ends receiving a threaded nut assembly for adjusting the coupling force applied across said joint;

b. first and second couplers disposed one in each of said structural components, each of said couplers bounding internal sockets open toward said joint and including coupler side walls spaced transversely from said connector axis and a coupler end wall separating said socket from an access recess in said structural component within which projects the end of said bolt;

c. a resilient shear cushion disposed within said sockets and spanning said joint, said shear cushion having an outer configuration complementary to the inner configuration of said sockets and a central channel through which said bolt may pass; and, d. a resilient compression cushion disposed at either end of said bolt intermediate said nut assembly and the outer face of said coupler end wall.

13. The connector of claim 12, further comprising a resilient bending cushion disposed at said joint generally transverse said connector axis extending outwardly from the open ends of said sockets.

14. The connector of claim 12 or 13, further comprising a metal shear key spanning said joint, disposed within said central channel intermediate said shear cushion and said bolt.

15. The connector of claim 14, wherein said shear cushion is bonded to said shear key.

16. The connector of claims 12 or 13, wherein said components are concrete components and further wherein said couplers are disposed in said concrete prior to cure thereof.

17. The connector of claim 16, further comprising anchoring means for securing said couplers in said concrete component.

18. The connector of claim 17, wherein said anchor means include anchoring apertures in said couplers for receiving anchor tendons which terminates in anchor locks.

19. The connector of claim 18, wherein said anchor means further includes a re-entrant wall on said coupler end walls.

20. A connector for joining adjacent structural components, which may be subjected to bending, shear, tensional and/or torsional forces at the joint comprising:

a. a plurality of fixture bolts disposed in spaced, generally parallel relationship along a connector axis, spanning the joint between adjacent structural components, each of said bolts terminating in threaded ends and cooperating threaded nuts for establishing an adjustable compressive force across said joints;

b. first and second couplers disposed one in each of said structural components, each of said couplers defining a plurality of internal sockets open toward said joint, each fixture bolt passing through a respective socket bounded by coupler side walls spaced transversely of said bolt and coupler end walls separating said socket from an associated access recess formed in said structural component within which the ends of said bolts project through fixture apertures in said end walls; and, c. resilient shear cushions disposed in each of said sockets and spanning said joint, each of said shear cushions having an outer configuration complementary to the inner configuration of said sockets and a central channel through which an associated one of said bolts may pass.

21. The connector of claim 20, further comprising a resilient compression cushion disposed at either end of each of said bolts intermediate said nut and said coupler end wall.

22. The connector of claim 21, further comprising a resilient bending cushion disposed at said joint generally transverse said connector axis.

23. The connector of claim 22, wherein said bending cushion is formed with a plurality of apertures configured to permit each of said shear cushions to pass therethrough.

24. The connector of claims 20, 21 or 22, further comprising a plurality of metal shear keys spanning said joint, one of each disposed within one of said central channels intermediate said shear cushion and said bolt.

25. The connector of claim 24, wherein said shear cushion is bonded to said shear key.

26. The connector of claim 24, wherein said components are concrete components and further wherein said couplers are disposed in said concrete prior to cure thereof.

27. The connector of claim 26, further comprising anchor means for securing said couplers in said concrete component.

28. The connector of claim 27, wherein said anchor means are comprised of a plurality of anchor apertures formed in said end wall for receiving anchoring tendons which terminate in anchor locks.

29. The connector of claim 28, wherein said anchor means further includes a re-entrant wall on said coupler end walls.

30. A connector for joining two water-borne structural components constituting an array of at least two such components, comprising:
 a. a fixture means for spanning the immediate region of a joint between two water-borne structural components and securing the same together along a connector axis, said fixture means terminating on either side of said joint at a location intermediate the length dimension of said sfructural components measured along said axis and including means for establishing a coupling-effective force across said joint independent of any force across remaining joints in any contiguous array of said structural components;
 b. shear pocket means circumscribing said fixture means intermediate the length thereof, defined within sockets formed in each of said components open toward said joint and terminating at an internal end wall; and
 c. a shear cushion disposed within said shear pocket means, spanning said joint and enveloping said fixture means.

* * * * *